(No Model.) 9 Sheets—Sheet 1.

L. EHRLICH.
CASH REGISTER AND INDICATOR.

No. 507,313. Patented Oct. 24, 1893.

Witnesses
Martin H. Olsen.
R. B. Caffray.

Inventor:
Leo Ehrlich
by Edward Rector
his atty.

(No Model.)

9 Sheets—Sheet 5.

L. EHRLICH.
CASH REGISTER AND INDICATOR.

No. 507,313.

Patented Oct. 24, 1893.

Witnesses
Martin H. Olsen.
R. B. Caffray

Inventor
Leo Ehrlich
by Edward Rector
his atty

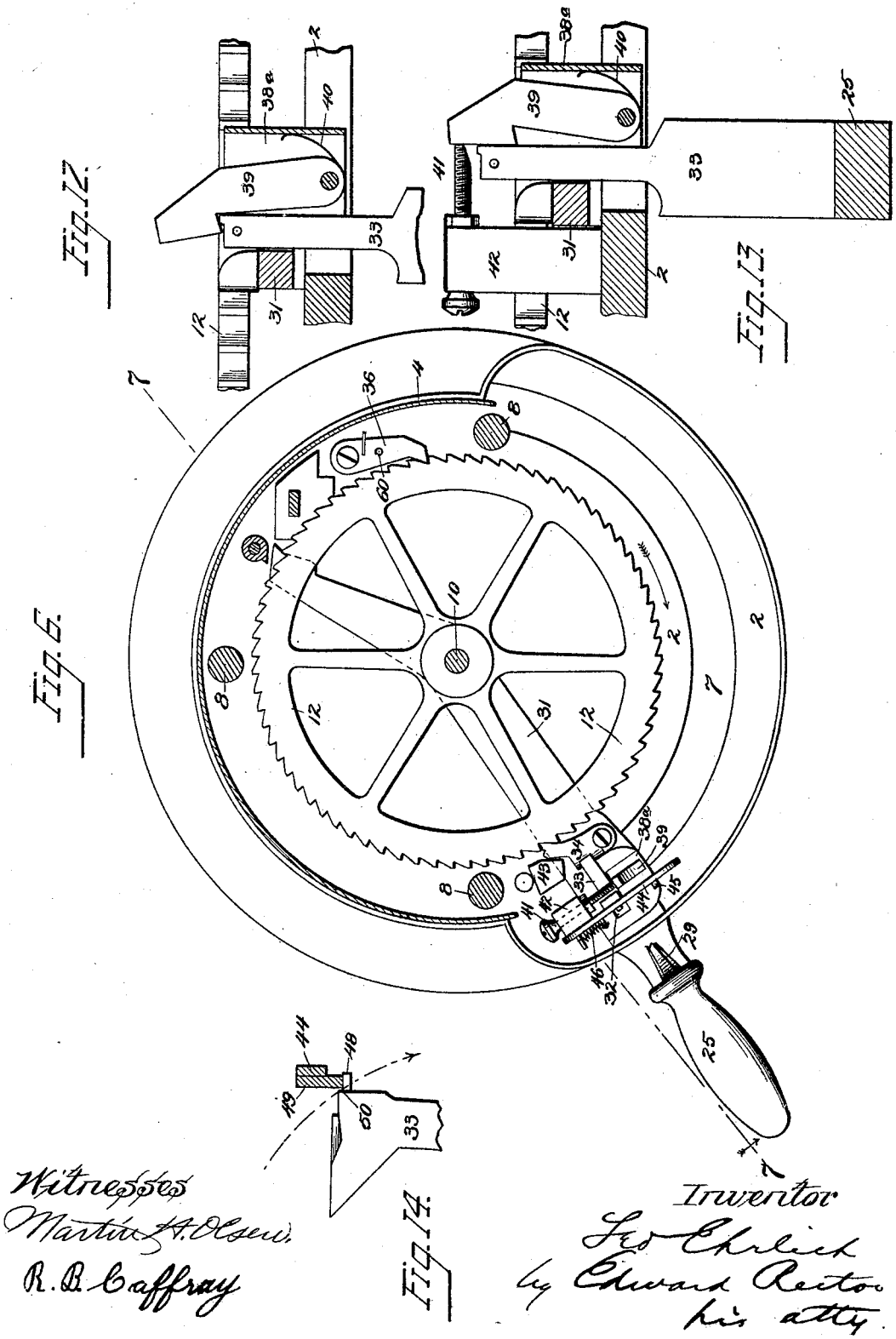

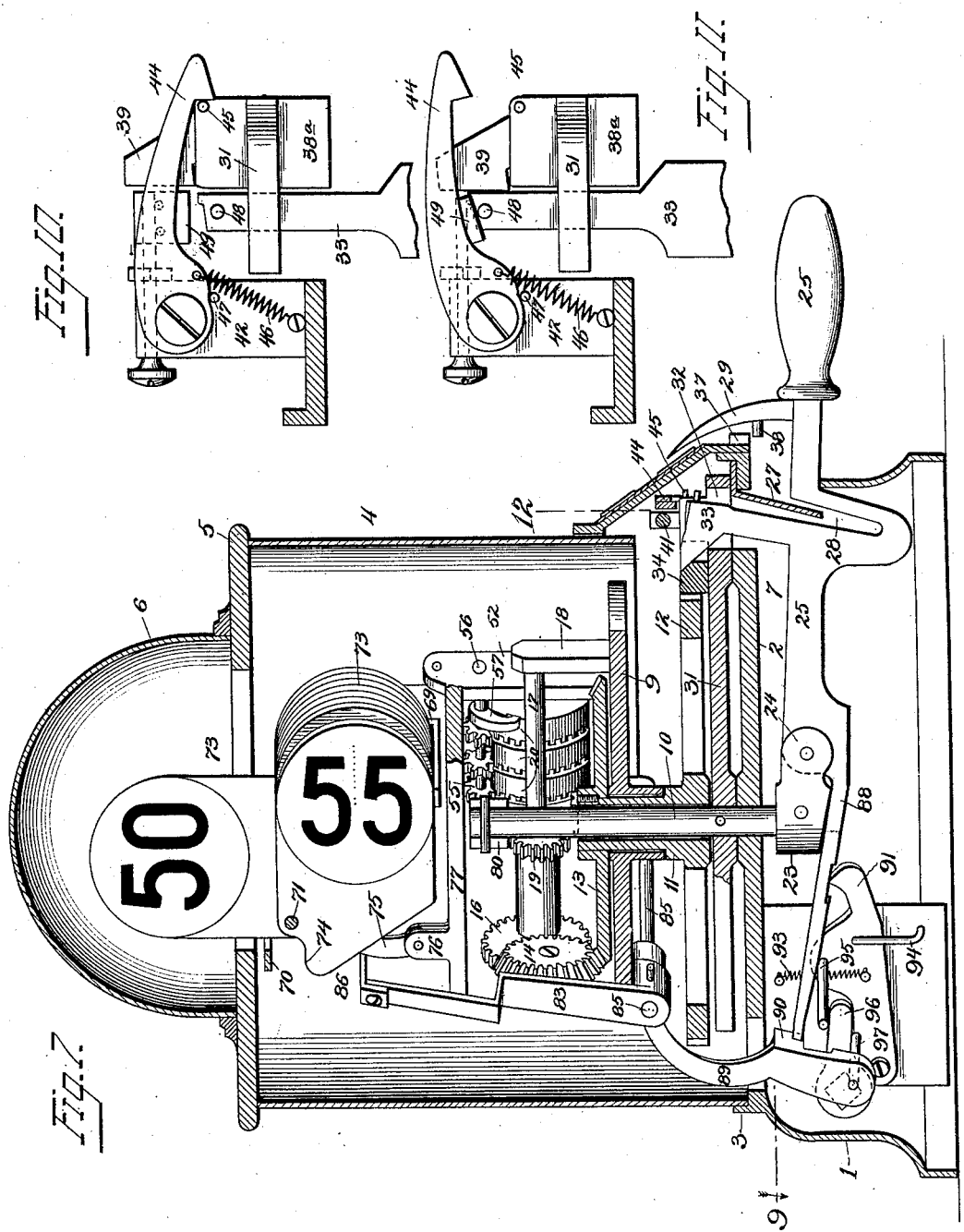

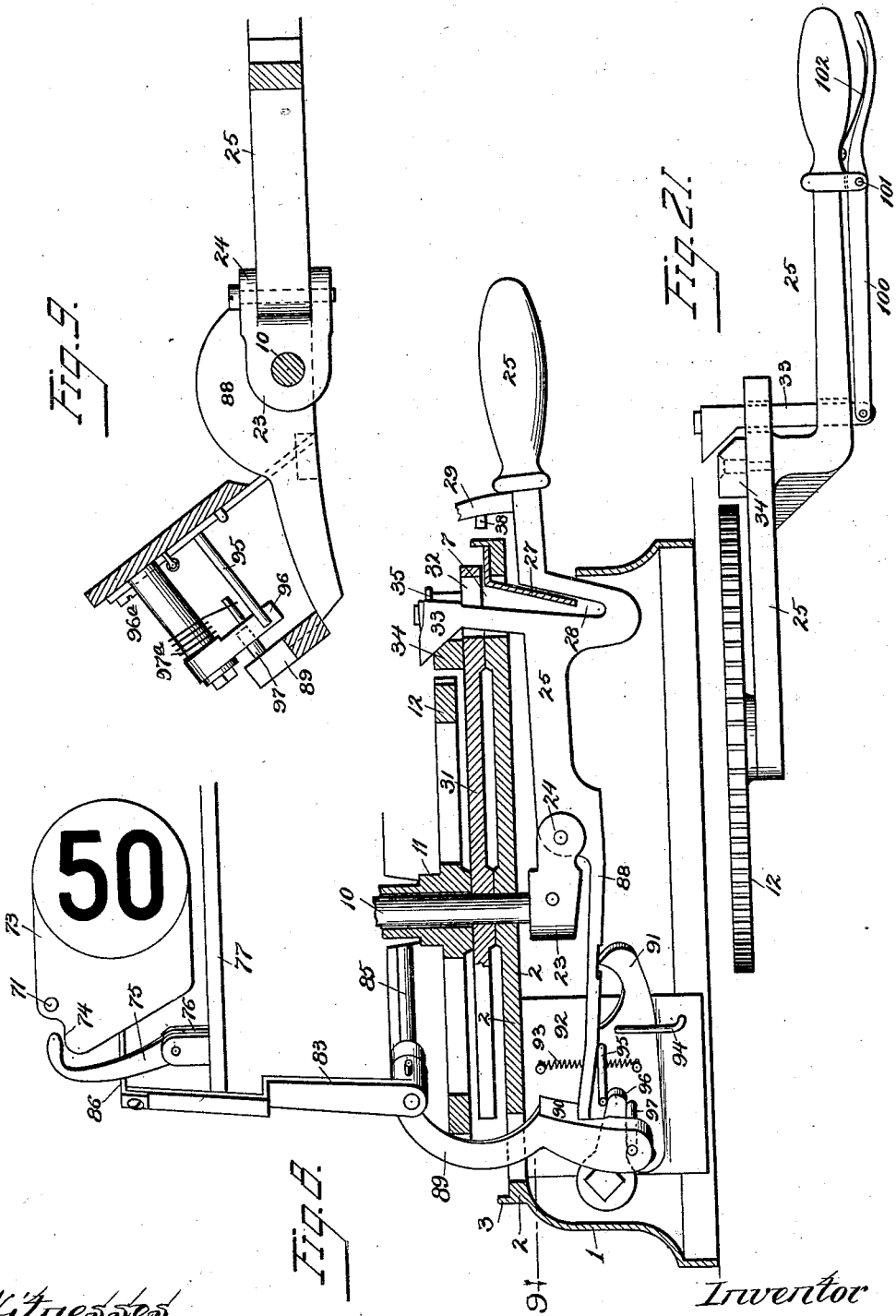

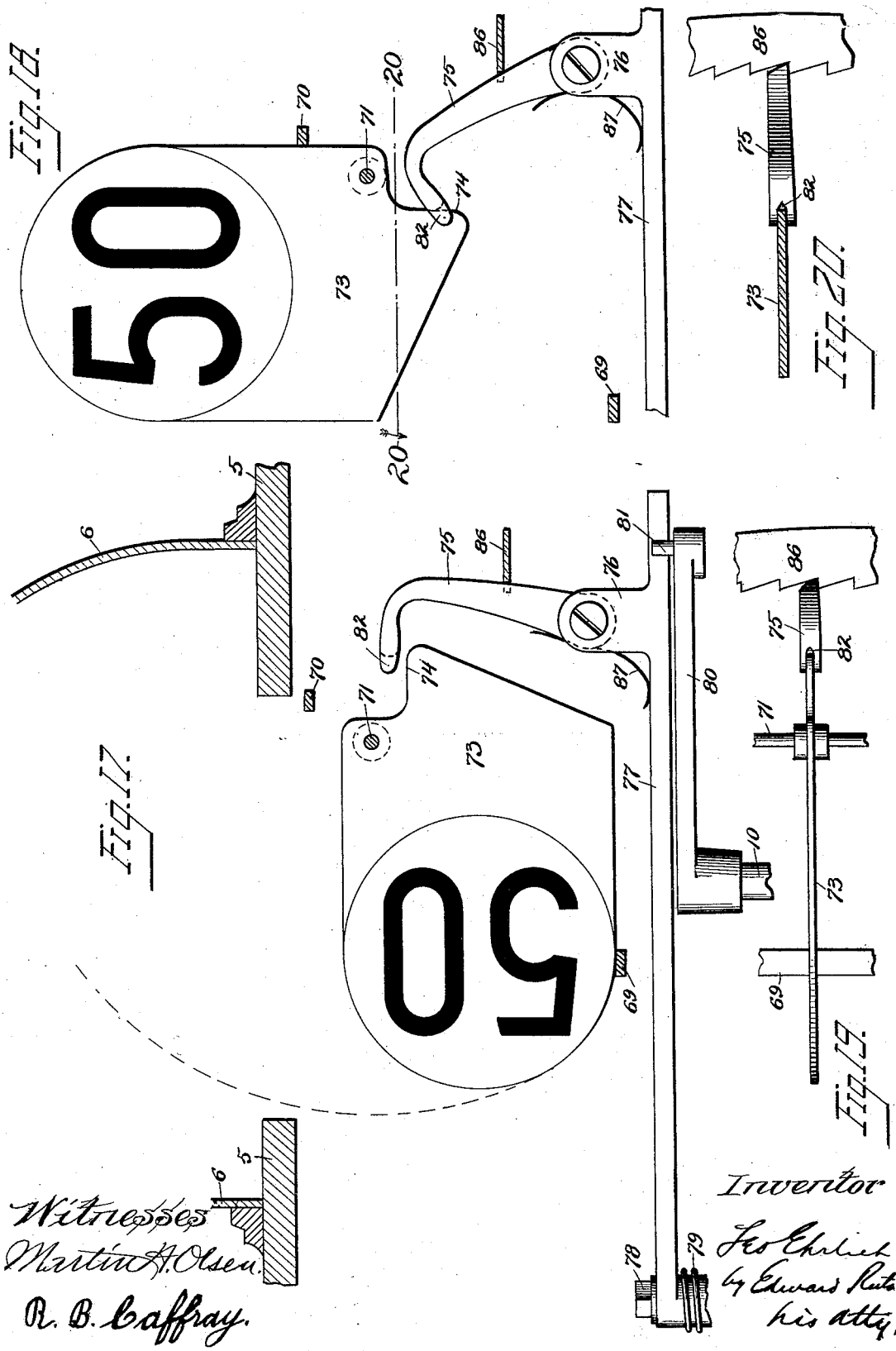

UNITED STATES PATENT OFFICE.

LEO EHRLICH, OF ST. LOUIS, MISSOURI, ASSIGNOR TO THE NATIONAL CASH REGISTER COMPANY, OF DAYTON, OHIO.

CASH REGISTER AND INDICATOR.

SPECIFICATION forming part of Letters Patent No. 507,313, dated October 24, 1893.

Application filed May 24, 1893. Serial No. 475,341. (No model.)

*To all whom it may concern:*

Be it known that I, LEO EHRLICH, a citizen of the United States, residing at St. Louis, in the State of Missouri, have invented a certain new and useful Improvement in Cash-Registers, of which the following is a description, reference being had to the accompanying drawings, forming part of this specification.

This application is a renewal of my former application, Serial No. 356,956, filed June 27, 1890.

The invention relates to that class of cash registers and indicators in which a single operating handle is employed for the purpose of indicating and registering different amounts, said handle being movable from normal position to different indicating and registering positions, and thence back to normal position, to indicate and register different values.

The novelty of my invention consists in the new combinations, modes of operation, and constructions and arrangements of parts, which will be hereinafter set forth and specifically pointed out in the claims.

Figure 1:
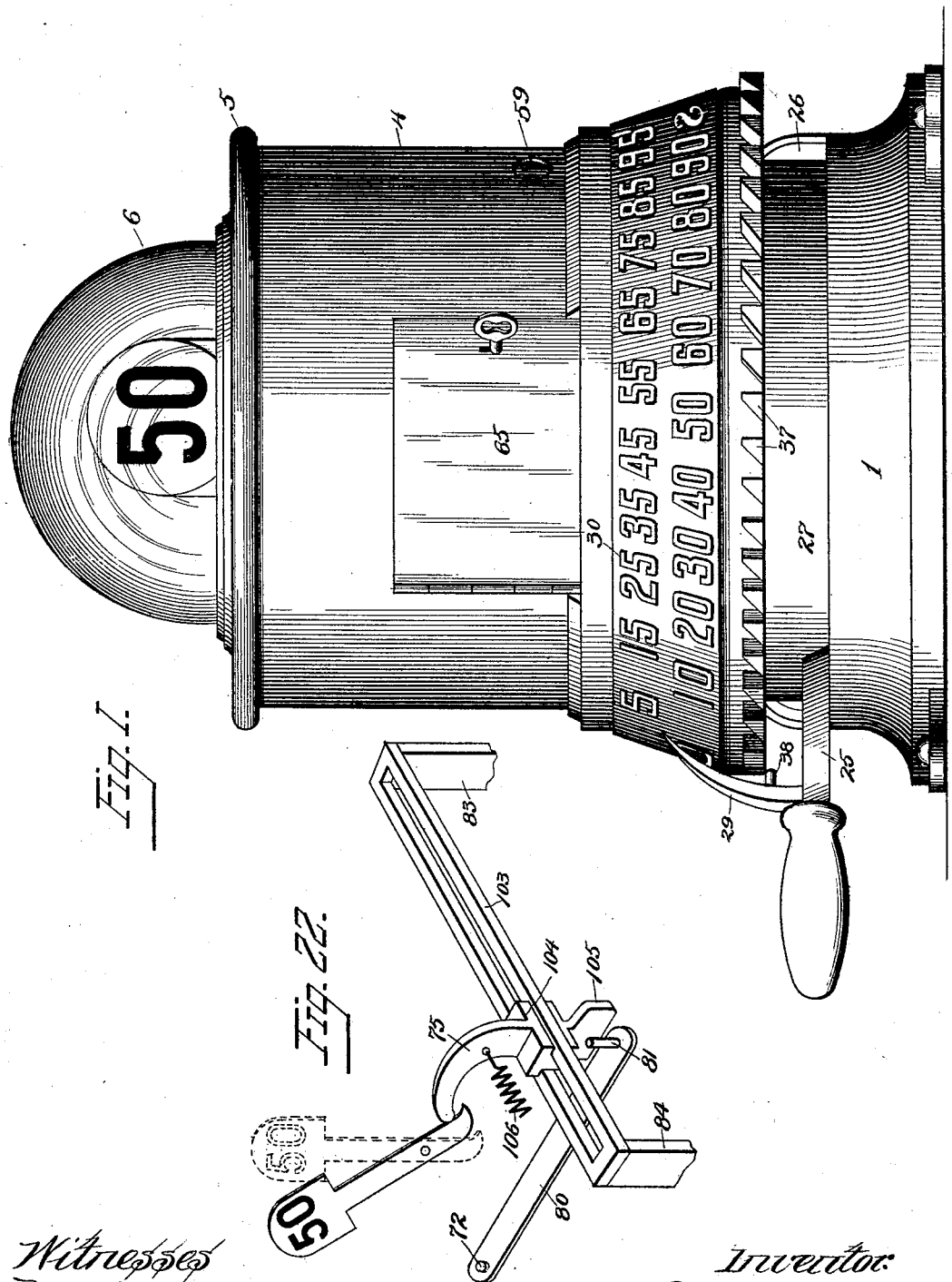
Figure 2:
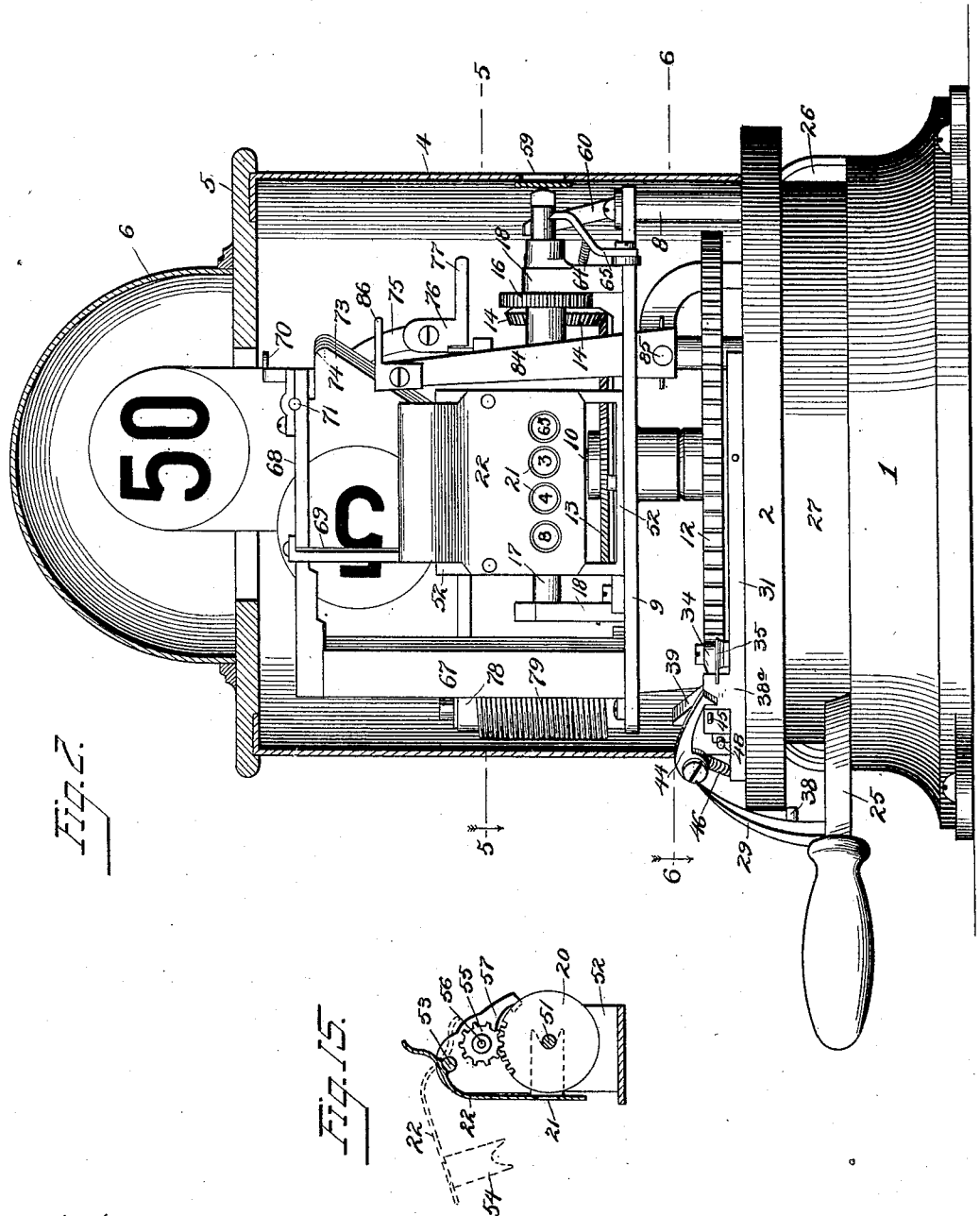
Figure 3:
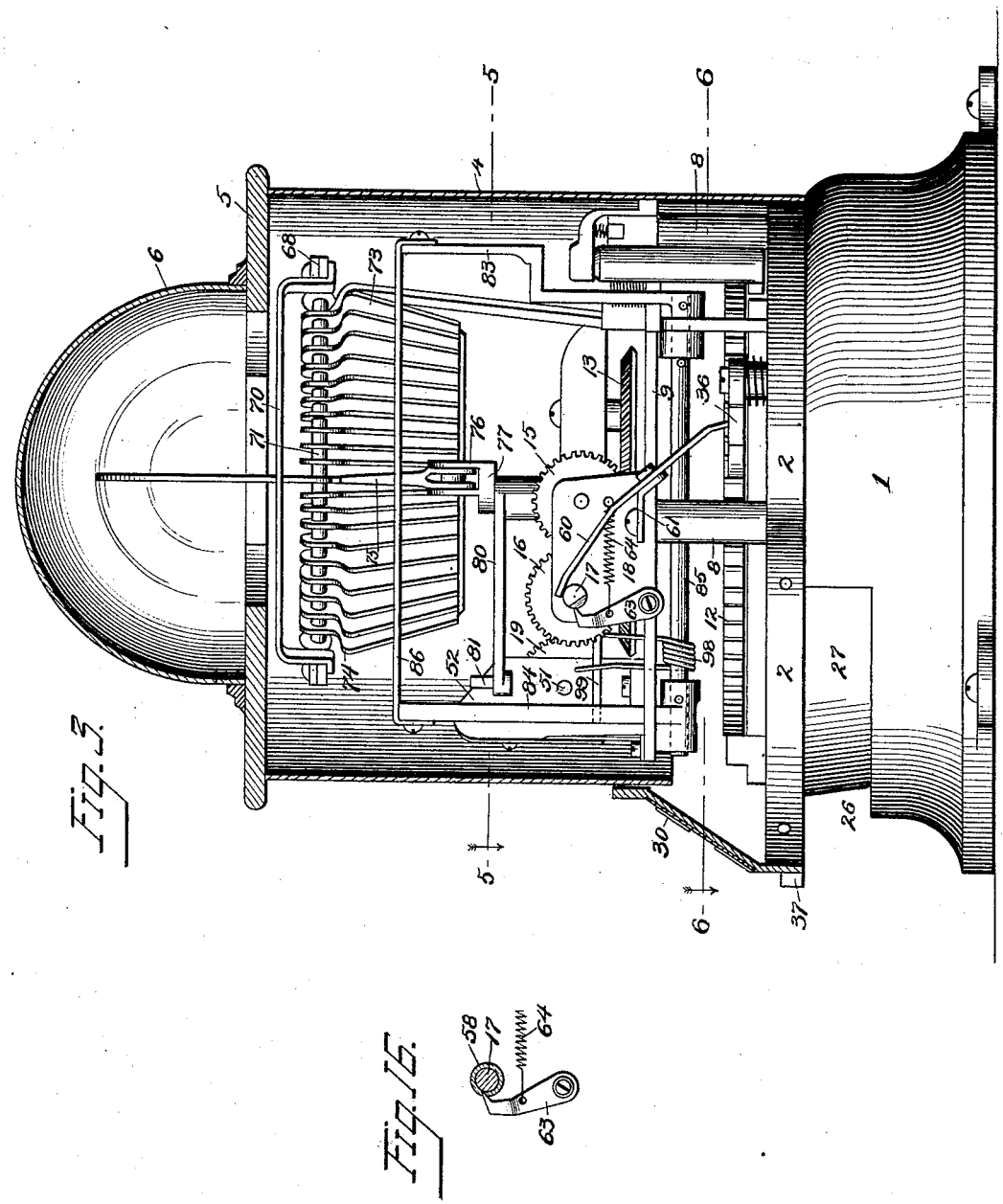
Figure 4:
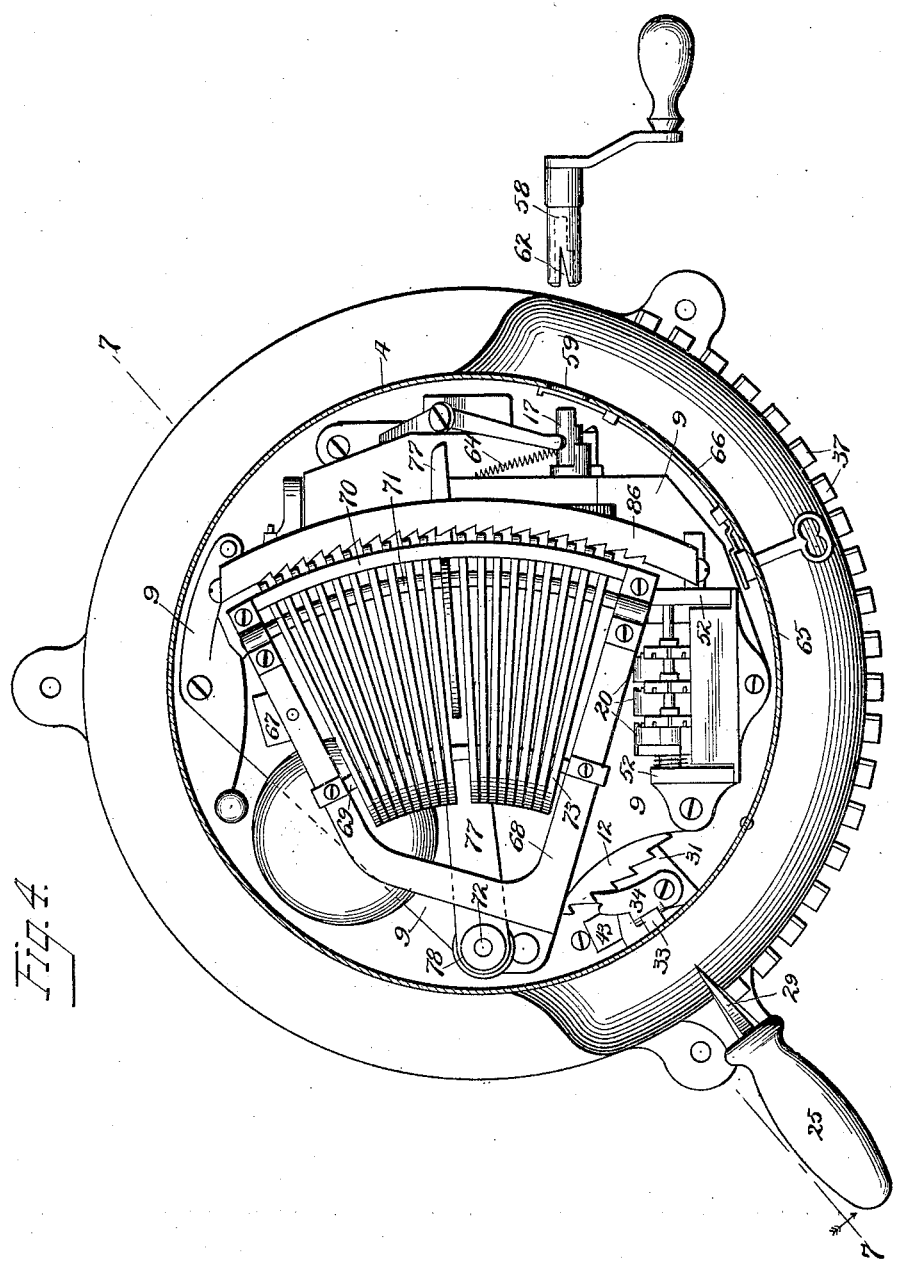
Figure 5:
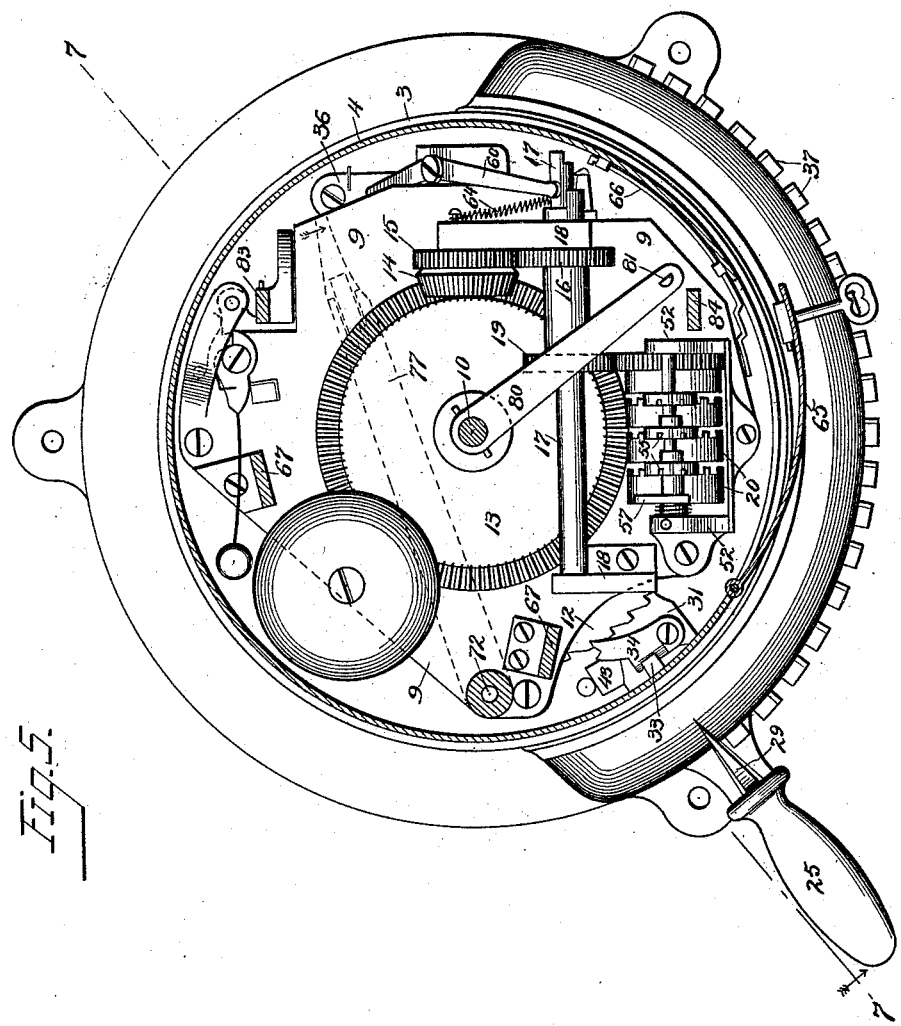

In the accompanying drawings Figure 1 represents a front elevation of my improved machine, the operating arm being at its extreme left hand and down position, it having been operated to register fifty cents, and has consequently exposed an indicator bearing the numerals 50; Fig. 2 a similar view, the inclosing case being in section, exposing the interior devices in elevation; Fig. 3 a side elevation, the parts being in the same position as shown in Figs. 1 and 2, the inclosing case being also shown in section; Fig. 4 a plan view of the same, the inclosing case being in section; Fig. 5 a horizontal section taken on the lines 5—5 of Figs. 2 and 3; Fig. 6 a similar section taken on the lines 6—6 of Figs. 2 and 3; Fig. 7 a central sectional elevation taken on the lines 7—7 of Figs. 4, 5 and 6, and looking in the direction of the arrow; Fig. 8 a similar view of the lower portion of the devices shown in Fig. 7, the operating handle having been moved vertically into its up position; Fig. 9 a horizontal section taken on the lines 9—9 of Figs. 7 and 8, showing the devices within the base of the register in plan view; Figs. 10 and 11 sectional elevations in different positions of the latch and pawl-carrier and their immediate connections; Figs. 12 and 13 detail sectional elevations, showing particularly the lock and its immediate connections; Fig. 14 a detail sectional elevation, illustrating the means of preventing the actuating arm from being returned to its down position; Fig. 15 a sectional elevation through the counting dials; Fig. 16 a sectional detail of the detent for preventing a forward movement of the counting dials by means of the handle or key; Figs. 17 and 18 detail sectional elevations of an indicator and the means for moving it to its exposed position, the parts being shown in different positions; Fig. 19 a plan view of the devices shown in Fig. 17; Fig. 20 a horizontal section taken on the line 20—20 of Fig. 18; Fig. 21 a sectional elevation of a modified form of the actuating arm and the finger for controlling the engagement of the pawl with the registering wheel; Fig. 22 a perspective view of a modified form of the indicators, the searcher and its actuating bar.

The same numerals of reference are used to indicate identical parts in all the figures.

The casing of the machine consists of a hollow base 1, of circular form in cross-section, and having the top plate 2 provided with a peripheral flange 3, Figs. 2, 5, 6 and 7. Resting upon the plate 2 and snugly fitting within the flange 3 is a vertical cylinder 4 forming the main body of the casing, and surmounted by a cap-plate 5 having secured upon its upper side a central glass dome 6. The forward half of the plate 2 is extended as seen in Figs. 3 and 6 until its periphery is substantially flush with the circular lower edge of the base of the machine, and is provided with a curved opening 7 concentric to the central axis of the machine, for a purpose to be explained.

Supported by posts 8 upon the plate 2 is a second horizontal plate 9 of irregular shape, Figs. 2, 3, 4, 5, 7 and 8. The plates 2 and 9 form bearings for a central shaft 10, Fig. 7, which projects at its lower end through the plate 2 and at its upper end through the plate 9. Surrounding the shaft 10 and extending upward through the plate, the latter being provided with a pendent tubular bearing surrounding it, is a hub 11 having fast upon or formed integral with its lower end a toothed wheel 12, and upon its upper end, above the plate 9, a beveled gear wheel 13 which meshes with a beveled pinion 14 having fast upon its side a straight pinion 15, Fig. 5, which meshes with a pinion 16 fast upon a sleeve 17ª fast upon a shaft 17 mounted in supports 18 upon the plate 9, the pinions 14 and 15 being journaled upon a stud on one of said supports, Figs. 2 and 3. Fast upon the end of the sleeve 17ª is a pinion 19, Fig. 5, which forms the driving pinion for a train of registering wheels 20 mounted in a suitable frame upon the plate 9. The numbers upon these wheels are adapted to be exposed singly at reading openings 21 in a plate 22, Fig. 2, and suitable transfer devices are combined with the wheels to cause the revolution of each wheel to advance the next higher wheel one number in the usual manner.

Fastened upon the lower end of the central shaft 10 beneath the plate 2 is a collar 23 provided with ears 24, Fig. 9, between which is pivoted the operating handle or lever 25. One end of this lever projects through an opening 26 in the hollow base 1 and is provided upon its outer end with a suitable grasping knob. The opening 26 in the base 1 is substantially co-incident with the opening 7 in the plate 2, Fig. 6, and the opening is closed, to prevent access to the interior of the machine, by a curved plate or shield 27, Figs. 1, 2, 3, 7 and 8, provided at its upper end with an outwardly projecting flange which rests upon and is secured to the portion of the plate 2 in front of the opening 7 therein. To accommodate the shield plate 27 the lever 25 is provided with a vertical slot 28, Figs. 7 and 8, which embraces said plate 27 and permits the lever to swing laterally and also have limited play vertically. The outer end of the lever has secured to it an upwardly and inwardly curved pointer 29 which co-operates with a series of index numbers 30 formed upon an inclined forward portion of the casing, Fig. 1.

The mode of operation of the machine consists in lifting the outer end of the lever 25 from the normal position shown in Figs. 1, 2 and 7 to its upper limit of movement, Fig. 8, then swinging the lever to the right until the pointer 29 stands opposite the number to be indicated and registered, and then depressing the lever again and swinging it back to normal position. During its movement to the right it will be disconnected from the registering wheels, while its depression at the end of such movement will connect it with said wheels, so that during its return movement it will actuate said wheels to add upon them the number to which the pointer has been moved. The movement of the lever to the right also causes a part moving with the lever to be brought opposite the indicator bearing the same number as that indicated by the pointer. The depression of the lever causes such part to engage such indicator, and the return of the lever to initial position causes such part to move the indicator into position to be exposed to view through the glass dome 6 at the top of the casing, as will be hereinafter described.

The means for connecting the operating lever with and disconnecting it from the registering devices will be first described, reference being had to Figs. 2, 4, 5, 6, 7 and 8. Fast upon the central shaft 10 above the base plate 2 and in line with the operating lever 25 beneath said plate is an arm or pawl-carrier 31, Figs. 2, 6, 7 and 8, whose outer end projects over the opening 7 in the plate 2 and is provided with a narrow slot 32 radial to the shaft 10 and co-incident with the slot 7. Through the slot 32 passes the upper end of an arm 33 secured upon or formed integral with the operating lever 25, Figs. 7 and 8. Pivoted upon the upper side of the arm 31 near its outer end, Figs. 4, 5 and 6, is a pawl 34 adapted to co-operate with the toothed periphery of the wheel 12 heretofore described, Fig. 7. The inner edge of the upper end of the arm 33 is beveled, as seen in Figs. 7 and 8, to co-operate with the pawl 34, said beveled portion being adapted to engage the pawl and force the latter into engagement with the wheel 12 when the operating lever is depressed, as seen in Figs. 4 to 7. When the operating lever is in elevated position, Fig. 8, the pawl 34 is held out of engagement with the wheel 12 by a spring 35, Figs. 2 and 6. It will thus be seen that when the operating lever 25 is lifted from the position shown in Figs. 1 to 7, at the beginning of an operation of the machine, the beveled upper end of the arm 33 will release the pawl 34 and the spring 35 disengages it from the wheel 12, so that during the movement of the lever to the right said wheel remains stationary, a pawl 36, engaging the wheel at its opposite side, Fig. 6, preventing any accidental backward movement of it. When the pointer 29 is brought opposite the desired number and the handle is depressed, as before explained, the beveled arm 33 will press the pawl 34 into engagement with the wheel 12, so that during the return movement of the handle to the left said wheel will be turned with it, and caused to actuate the registering wheels, through the medium of the beveled gear 13 and pinions 14, 15, 16 and 19, to add upon the registering wheels the amount represented by the number to which the pointer has been moved. There is provided upon the outer surface of the casing, above the opening 26 through which the lever 25 plays, a series of lugs 37, inclined upon one side, and having narrow passages between them, Figs. 1, 4 and 5. The pointer 29 has upon its inner side a stud 38 which co-operates with these lugs, and prevents the handle being depressed, during or after its movement to the right, except when the pointer 29 stands directly opposite some number upon the index, thereby insuring the engagement of the pawl 34 with the wheel 12 at the proper point to register the exact amount of such number, and also preventing the depression of the lever except when the movable part heretofore referred to stands directly opposite some one of the indicators, as presently explained.

It will be seen that after the operating lever is depressed and the pawl 34 engaged with the wheel 12 the pawl 36, Fig. 6, which prevents backward movement of said wheel, likewise prevents any backward movement of the operating lever and necessitates the return of it to initial position before it can be moved to the right again, thereby insuring the registration of the number indicated by the pointer at each operation of the machine.

For the purpose of locking the lever in depressed position, after it has been moved to the right and depressed, and to prevent its being lifted again before it has been returned to initial position and the proper amount registered, there are provided the following means, reference being had to Figs. 6, 12 and 13: Pivoted at its lower end in a housing 38ª, Figs. 2, 6, and 10 to 13, in the outer end of the pawl-carrying arm 31, at the right of the slot 32 in the latter through which passes the arm 33 of the operating lever, is a locking dog 39 which is normally pressed to the left by a spring 40. When the lever is in its extreme left hand position the upper end of this locking dog 39 contacts with the end of a screw 41 carried by a bracket 42 upon the base plate 2, and is held in right hand position, against the stress of the spring 40, so that the lever 25 and its arm 33 are free to be lifted, as seen in Fig. 13. When they are once lifted the upper edge of the arm 33 is above the shoulder of the locking dog and it then serves to hold the dog in right hand position while the lever is being moved to the right; but when this movement of the lever is completed and the lever is depressed the dog 39 catches over the upper end of the arm 33 as soon as the latter passes below its shoulder, and locks the lever in depressed position, as seen in Fig. 12. The dog 39 thus locks the lever in depressed position during its movement to the left, and when the lever reaches initial position the dog engages the screw 41 and releases the lever, ready for the next operation.

For the purpose of preventing any overthrow of the wheel 12 in case the operating lever should be quickly or violently returned to initial position and lifted, there is provided a wedging block or stop 43, Figs. 4, 5 and 6, between which and the wheel 12 the end of pawl 34 is confined at the end of the movement of the lever to the left and by which the pawl is positively held in one of the notches in the wheel 12 to lock the latter from movement until the lever is moved to the right again and the pawl carried away from the block 43. There are also provided means for automatically locking the operating lever in its extreme left hand position, at the end of each operation of the machine, and preventing movement of it to the right again until it has been lifted to its upper position. As seen in Figs. 2, 6, 10 and 11 the post or bracket 42, heretofore referred to, has pivoted to its forward side a hooked latch 44 which projects to the right and is adapted to co-operate with a stud or pin 45 upon the forward side of the housing 38ª carried by the arm 31. A spring 46 connected to the latch 44 yieldingly holds it in normal position, Fig. 10, against a stop 47 upon the bracket 42. When the operating lever is returned to initial position at the end of an operation of the machine the pin 45 rides under the beveled nose of the latch 44 and the latter hooks over the pin and locks the lever and parts moving with it in initial position. When the lever is lifted, at the beginning of the next operation of the machine, a pin 48 upon the forward side of the upper end of the arm 33 engages a lug or plate 49 upon the inner side of the latch 44 and lifts the latter to the position shown in Fig. 11, thereby disengaging its hook from the pin 45 and releasing the lever and parts moving with it, so that they are free to be moved to the right again. As soon as they are moved to the right far enough to carry the pin 48 from under the plate 49 of the latch 44 the latter will drop to normal position again, ready to re-engage the pin 45 when the lever is returned to initial position. It will be understood that when the lever is lifted the pin 48 is carried out of the vertical plane of the latch 44, so that it is not caught by the hook of the latter in the movement of the parts to the right after the pin has cleared the plate 49 and the latch dropped to normal position.

The pin 48 is located upon the arm 33 just below the upper surface of the latter, so that a shoulder 50, Fig. 14, is formed, which, as the arm 33 moves in the arc of a circle having the pivotal point of the lever 25 as a center, will catch against the inner side of the plate 49 on the latch 44 if an attempt be made to return the lever to its depressed position after it has been lifted, and thereby prevent such return movement.

Instead of forming the pawl-carrier 31 and operating lever 25 of independent parts they might, so far as the registering mechanism is concerned, be formed integral, or rigidly secured together, as seen in Fig. 21, the pawl 34 being mounted upon the carrier 31 in the manner before described and adapted to be moved into engagement with the wheel 12 by a beveled arm corresponding to the arm 33, which arm, however, in this instance, is not rigidly secured to or formed integral with the lever 25, but is passed through guide slots in said lever and in the outer end of the pawl carrier 31 and has its lower end pivoted to a lever 100 which is pivoted near its middle to the operating lever 25 at 101. The spring 102 interposed between the end of the lever 100 and the grasping knob of the lever 25 presses the outer end of the lever 100 downward and yieldingly holds its opposite end and the arm 33 in elevated position. Upon grasping the knob of the lever 25 and pressing the outer end of the lever 100 against it the arm 33 will be pulled downward and its beveled inner edge will force the pawl 34 into engagement with the wheel 12; as will be readily understood.

The registering wheels heretofore referred to are mounted upon a shaft 51 fixed in a bracket frame 52, Figs. 2, 3, 4, 5, 7 and 15, carried by the frame plate 9. The plate 22 having the side openings 21, heretofore described, Fig. 2, is hung at its upper end upon a rod 53 carried by the frame 52, so that the plate 22 can be swung upward to the position indicated by the dotted lines in Fig. 15. The plate 22 carries at one side an arm or plate 54 having a notch or groove in its end and adapted to pass between the left hand registering wheel and the side frame 52, and its notch to fit over the shaft 51, as seen in Fig. 15. The arm 54 serves to hold the registering wheels in proper position upon the shaft 51, when the plate 22 is in normal position; but when the plate is swung up to the position shown by the dotted lines in Fig. 15 the registering wheels are left free to be moved horizontally along the shaft 51, to be thereby disengaged from the transfer pinions which connect them, so that they may be independently turned to zero or initial position by hand. The transfer pinions 55 are loosely mounted upon a shaft 56 carried by the frame 52 and co-operate with toothed wheels and gears upon the registering wheels in the usual manner. A pawl 57, Figs. 5, 7, and 15, hung upon the shaft 56, is spring-pressed against the periphery of the high registering wheel and co-operates with a notch therein to arrest the wheel when it and the other wheels have been turned to zero.

As seen in Figs. 2 to 5 one end of the shaft 17 which carries the pinions 16 and 19 extends through one of its supporting brackets 18 to a point adjacent the casing of the machine, and its end is shaped to receive a wrench 58, Fig. 4, adapted to be inserted through an opening 59 in the casing, and by which the shaft 17 may be rotated to turn the registering wheels to zero in this manner, instead of turning them to zero independently by hand when the plate 22 is swung to the position indicated in Fig. 15, as before described. For the purpose of disengaging the pawl 36 from the wheel 12 while the shaft 17 is being rotated to turn the registering wheels to zero there is provided a lever 60, Figs. 2, 3, 4 and 5, pivoted to a plate 61 carried by one of the posts 8, Fig. 3, the upper end of said lever resting against the shaft near its outer end, and the lower end of the lever extending downward and being suitably connected to the pawl 36, Fig. 6. When the wrench 58 is applied to the shaft 17 and slipped over its end it will throw the upper end of the lever 60 inward and its lower end outward and disengage the pawl 36 from the wheel 12, so that the latter will be free to be turned backward with the shaft 17. In order to prevent the wheel 12 and the registering wheels from being turned in a forward direction the wrench 58 is provided with a notch 62 adapted to be engaged by a detent 63, Figs. 2 and 3, pivoted to a lug upon the plate 9 and held in position to engage the notch in the wrench by a spring 64, Fig. 16. From this latter figure it will be seen that the wrench and shaft 17 are free to be turned to the right, but that the detent 63 will prevent movement of them to the left.

The front of the cylindrical portion 4 of the casing is provided with a door 65 which may be opened to expose the numbers upon the registering wheels through the sight openings in the plate 22, Fig. 2. The opening 59 through which the wrench 14 is inserted is controlled by a slide 66 mounted in guides upon the inner face of the casing, Figs. 4 and 5, and to which access may be had when the door 65 is opened. When the slide is moved to position to uncover the opening 59 its end adjacent the door 65 will stand in such a position that a projection upon the inner side of the door, the lock in this instance, will strike it when it is attempted to close the door, and prevent the door being entirely closed until the slide has been returned to normal position to uncover the opening 59. The engagement of the lock or projection upon the inner face of the door with the end of the slide 66 prevents the latter being forced to the left by any instrument applied at the opening 59 while the door 65 remains closed.

The indicating mechanism may be next described as follows: Supported upon the upper ends of posts or vertical bracket plates 67, Figs. 2, 4 and 5, secured at their lower ends to the frame plate 9, is a forked frame 68, Fig. 4, consisting chiefly of two divergent arms connected by suitable cross pieces 69 and 70, the former at or near the inner ends of the arms and the latter at a point nearer the opposite end of the frame. Fixed at its opposite ends in the arms of the frame 68 near their outer ends is a curved rod 71. The cross pieces 69 and 70 and the rod 71 are curved in the arc of a circle approximately concentric to the point 72, and loosely hung upon the rod 71 is a series of indicating tablets or plates 73 arranged approximately radially to the point 72, and suitably spaced and separated by interposed collars upon the rod 71. There is one of these tablets for each amount which the machine is capable of indicating and registering, and each tablet bears upon one or both faces a large indicating number representing the amount to be indicated by it. These tablets are in this instance of an approximately rectangular shape, Fig. 17, and are hung upon the rod 71 at one corner, so that when unrestrained the tablets will fall by gravity to a horizontal position and rest upon the cross piece 69 of the frame 68, as seen in Figs. 3, 4, 7 and 17. When the tablets are thrown to vertical position, by the means hereinafter described, their movement is limited by and they rest against the cross piece 70 of the frame 68. When in a horizontal position the tablets are hidden from view, but when thrown into vertical position their numbers are exposed through the glass dome 6 upon the top of the casing. Each tablet, at one of its upper corners, adjacent its pivotal support, is cut away to form a shoulder 74. These shoulders are adapted to be engaged by the upper end of an arm 75 (hereinafter called the searcher or searcher-arm) pivoted at its lower end between ears 76 upon a horizontal arm 77 pivoted at the point 72 upon the upper end of a post 78 carried by the plate 9, Figs. 2, 3, 4, 5, 7 and 17. A coiled spring 79 surrounding the post 78 and connected to the arm 77, Figs. 2 and 17, tends to swing the arm 77 in the direction of the arrow Fig. 5 and yieldingly holds it in extreme position at one side of the frame 68. Fast upon the extreme upper end of the central shaft 10, and projecting therefrom at approximately a right angle to the operating lever 25, Figs. 3, 5 and 17, is an arm 80 having upon its upper side near its outer end a pin 81 projecting into the horizontal plane of the arm 77. Whenever the operating lever 25 is swung to the right from initial position the pin 81 will engage the arm 77 and carry the latter with the arm 80, and the adjustment and arrangement of the parts are such that when the pointer 29 stands opposite a given number upon the index 30 the arm 75 carried by the arm 77 will stand directly opposite the particular indicator which bears said number. The upper end of the arm 75 is curved toward the row of indicators and is provided with a slot or notch 82, Figs. 17 to 20, adapted to engage the edge of the indicator opposite which the arm stands, in case the arm be swung toward the row of indicators.

From the foregoing description it will be seen that if the operating lever be moved until the pointer 29 stands opposite a given number upon the index 30 and the arm 75 stands opposite the corresponding indicator, and the arm 75 be then swung toward the indicator its notch will embrace the edge of the latter, and that if the arm 75 be then swung still farther toward the indicator its curved upper end, engaging and depressing the shoulder of the indicator, will tilt the latter upon its pivotal support and swing it to vertical position, as seen in Fig. 18, and thereby expose its number to view through the glass dome. The means employed for first throwing the arm 75 into engagement with the proper indicator, and then moving it still farther to tilt the indicator to indicating position, may now be described as follows: Secured to the upper ends of a pair of arms 83 84, Fig. 3, which are secured at their lower ends upon a rock-shaft 85, is a curved plate 86, Figs. 2, 3, 4, 7 and 17. The forward edge of the plate 86 is curved in the arc of a circle approximately concentric to the point 72, and is provided with a series of notches, one opposite each indicator. The arm 75 extends upward between this plate 86 and the row of indicators. A spring 87, Figs. 17 and 18, yieldingly holds the arm 75 in normal position between the plate 86 and row of indicators and out of engagement with both of them, and when the plate 86 is thrown forward it will carry the arm 75 into engagement with one of the indicators, against the resistance of the spring 87.

By means to be described the depression of the operating lever 25 at the end of its right hand movement causes the plate 86 to be thrown forward far enough to engage the arm 75 and carry its notched upper end into engagement with the indicator corresponding to the number opposite which the pointer 29 stands at the depression of the lever. Upon then returning the lever to initial position the arm 80 with its pin 81 will be carried away from the arm 77, the engagement of the arm 75 with one of the notches in the plate 86 holding the arm 77 against return movement with the arm 80 under the influence of the spring 79. As the operating lever reaches initial position the plate 86, by means also to be described, is thrown still farther forward and the arm 75 is caused to tilt the indicator with which it is engaged to vertical position and expose its number in the glass dome. When the operating lever is lifted again, at the beginning of the next operation of the machine, the plate 86 is thrown rearward, away from the arm 75, the latter is disengaged from the indicator by its spring 87, and the arm 77 and parts carried by it are thrown backward to normal position by the spring 79, and the lifted tablet will fall to horizontal position and its number be withdrawn from view.

The means for imparting the above described movements to the plate 86 may now be described as follows: The lever 25 has secured to or formed integral with it a rearwardly extending arm 88, Figs. 7, 8, and 9. The rock-shaft 85 to which the arms 83 and 84 are secured has fastened to it a depending curved arm 89 provided upon the forward side of its lower end with a bearing surface 90 adapted to co-operate with the rear end of the arm 88 of the operating lever. A portion of the arm 88 adjacent to the central shaft 10 is extended to form an enlarged bearing surface, Fig. 9, against the under side of which bears the free end of a lever 91 pivoted to a bracket plate 92 secured to and depending from the base plate 2. The free end of this lever 91 is yieldingly held in elevated position, against the arm 88, by a coiled spring 93, and is guided in its vertical movements by a guide rod 94 secured to the plate 92. The lever 91 carries a laterally projecting pin 95 which bears against the upper surface of an arm 96 pivoted at its opposite end upon a stud 96ᵃ upon the bracket plate 92, Fig. 9. The arm 89 before referred to carries a laterally projecting pin 97 upon which rests the free end of the arm 96 above mentioned, a coiled spring 97ᵃ, Fig. 9, surrounding the pivotal support of the arm 96 and bearing against a pin upon the latter serving to press the arm 96 against the pin 97. The extended bearing surface of the arm 88 is of such extent that it will be engaged by the end of the lever 91 in any position to which the operating lever 25 may be turned. When the operating lever 25 is in its upper position the engagement of the arm 88 with the lever 91 will hold the end of the latter depressed so that its pin 95 will exert a corresponding pressure upon the arm 96 and press the latter against the pin 97 of the arm 89, thereby holding the lower end of the arm 89 in forward position and the upper ends of the arms 83 and 84 in rearward position, and the plate 86 out of engagement with the arm 75. The arms 89 and 83 and 84, and the plate 86, are held in this position against the stress of a coiled spring 98, Fig. 3, coiled around the rock-shaft 85 and engaging the pin 99 upon the arm 84, this spring tending to throw the arms 83 and 84 forward and carry the plate 86 into engagement with the arm 75. When the operating lever 25 is depressed, as at the end of its movement to the right, the arm 88 will be lifted, thereby permitting the free end of the arm 91 to rise and relieving the pressure upon the pin 97 of the arm 89, whereupon the spring 98 just described will throw the arms 83 and 84 slightly forward and carry the plate 86 into engagement with the arm 75 and move the latter into engagement with one of the indicators. The notch in the plate 86 which has engaged the arm 75 at this movement will hold the latter and the arm 77 in the position to which they have been moved, while the operating lever is returned to initial position and the registration of the amount to be indicated effected. Just as the operating lever reaches initial position the extreme rear end of the arm 88 will strike the bearing surface 90 of the arm 89, Fig. 9, and throw the lower end of said arm farther rearward, and carry the upper ends of the arms 83 and 84 and the plate 86 far enough forward to cause the arm 75 to tilt the indicator into vertical position and expose its number to view. The spring 98 aids in this movement of the plate 86, to facilitate which the arm 88 is provided upon its under side with a recess 88ᵃ into which the free end of the lever 91 springs as soon as the operating lever reaches initial position. When the operating lever is lifted to the position shown in Fig. 8, at the beginning of the next operation of the machine, the rear end of the arm 88 is disengaged from the bearing surface 90 of the arm 89, being carried below the same, so that the lower end of the latter is free to be moved forward again, and it is moved forward at the same time by the pressure of the arm 96 upon its pin 97, the lifting of the operating lever and depression of the arm 88 depressing the free end of the arm 91 and causing its pin 95 to depress the arm 96 and thus force forward the lower end of the arm 89. This forward movement of the arm 89 will throw the upper ends of the arms 83 and 84 rearward and carry the plate 86 rearward, away from the arm 75, permitting the spring 87 to disengage the latter from the indicator, and allowing the spring 79 to restore the arm 77 to initial position, ready to be carried forward again by the stud 81 on the arm 80 when the operating lever is moved to the right.

The locking dog 39 and latch 44, co-operating with the operating lever 25 in the manner described, provide means for insuring the proper movement of the desired indicator. Thus, after the searcher-arm 75 has once been placed in position to move a particular indicator the devices above referred to will prevent manipulation of the lever to expose a different indicator until after the arm 75 has moved the first mentioned indicator into indicating position. They also insure a movement of the operating lever to allow the exposed tablet to drop out of view before the lever is moved to expose another indicator.

It will be understood that, so far as the indicating mechanism is concerned, the registering mechanism may be widely varied without departing from the invention, and that so far as the registering mechanism is concerned the indicating mechanism may be likewise varied. It will also be understood that various modifications in the construction and arrangement of both the indicating and registering mechanisms may be made without departing from the general scope of my invention or changing the broad mode of operation of the machine. Thus, it is not essential that the indicators should be mounted in the arc of a circle and the arm by which they are actuated be made to move in the same direction. On the contrary the indicators may, if desired, be mounted in a straight row, and the arm 75 be arranged to reciprocate in a straight line, lengthwise of the row. In Fig. 22 I have shown such an arrangement of the parts, and also shown a different form of indicator which may be readily substituted for the one heretofore described. In that view the upper ends of the arms 83 and 84 carry a slotted bar 103 and the arm 75 is carried by a guide piece 104 fitting and confined in the slot in the bar 103. The guide piece 104 is provided with a pendent plate 105 which is adapted to be engaged by the pin 81 upon the arm 80, which is pivoted at the point 72, as heretofore described. A spring 106 connected to the arm 75 pulls the arm in one direction along the guide way in the bar 103 and tends to hold it at one end thereof. In this construction, instead of depending upon the engagement of notched plate 86 with the arm 75 to hold the latter in position opposite a given tablet, the arm is held in such position by the engagement of its slotted end with the indicator, and when the arms 83 and 84 and bar 103 are thrown forward at the end of the return stroke of the operating handle, in the manner heretofore described, the arm 75 will throw the indicator into vertical position and expose its number to view; as will be readily understood. When the operating lever is lifted to elevated position, at the beginning of the next operation of the machine, and the arms 83 and 84 are rocked rearward to normal position the arm 75 will be disengaged from the lifted indicator, which will drop to normal position, and the spring 106 will pull the arm to one end of the guide way, ready to be engaged and moved forward again by the pin 81 upon the arm 80.

It is not essential that the adjustment of the parts be such that the depression of the operating handle at the end of its non-registering stroke shall simply set the arm 75 or engage it with the indicator to be lifted, since it will be readily understood that the parts may easily be so arranged that the depression of the lever would throw the indicator fully into view; but it is desirable that the indicator shall not be exposed until its value has been registered by a complete return of the operating handle to initial position, so that it will not be possible to expose an indicator to view without first registering its value, and this is accomplished by causing the movement of the operating handle to the right and its depression to simply set the actuating arm for the indicator, and to cause the return of the operating handle to initial position to move the indicator into view. Again, while the operating handle and other parts are mounted upon a central shaft in the present machine, and the general construction of the machine made to conform to this arrangement, yet it will be understood that the same general construction may be employed and the same mode of operation carried out in a machine in which the operating handle reciprocates in right lines, instead of in the arc of a circle, and in which the various other parts of the machine are arranged to conform to this change.

Having thus fully described my invention, I claim—

1. The combination of a toothed register wheel, a horizontally reciprocating operating handle, a pawl-carrier movable with the handle, a pawl pivoted thereon and adapted to be engaged with and disengaged from the register wheel, and means for engaging the pawl with the wheel at the end of the stroke of the handle in one direction and disengaging it therefrom at the end of its stroke in the opposite direction, substantially as described.

2. The combination of a toothed register wheel, an operating handle movable back and forth in different horizontal planes, a pawl-carrier movable with the handle, a pawl pivoted thereon and means for engaging the pawl with the toothed wheel at the movement of the handle from one plane to the other at one end of its stroke and for disengaging it from the wheel at the movement of the handle back to the first plane at the opposite end of its stroke, substantially as described.

3. The combination of a register, a reciprocating operating handle movable back and forth in different planes, means for connecting the handle, and register at the end of one stroke of the handle and disconnecting them at the end of its opposite stroke, and a lock for preventing disconnection of the handle and register, after they have been connected at one end of the stroke of the handle, until the handle has completed its opposite stroke, substantially as described.

4. The combination of a register, a reciprocating operating handle movable back and forth in different planes, means for connecting the handle and register at the end of one stroke of the handle and disconnecting them at the end of its opposite stroke, a lock for preventing disconnection of the handle and register during the registering stroke, and means for preventing retrograde movement of the handle during such stroke, substantially as described.

5. The combination of a register, a reciprocating operating handle movable back and forth in different planes, means for connecting the handle and register at the end of one stroke of the handle, and disconnecting them at the end of its opposite stroke, and means operating at the end of the registering stroke of the handle to prevent movement of it in the opposite direction until it is disconnected from the register, substantially as described.

6. The combination of a register, an operating handle movable back and forth in different horizontal planes and having a registering movement in one plane and a non-registering movement in the other, means for connecting the handle and register at the end of one stroke of the handle and disconnecting them at the end of its opposite stroke, and means for automatically locking the handle in the registering plane, when moved into the same, and compelling its full registering stroke before it can be moved into the non-registering plane, substantially as described.

7. The combination of a horizontally arranged toothed registering wheel, a reciprocating operating handle fulcrumed on the axis of said wheel, a pawl movable with the handle, means for moving the pawl into engagement with the toothed wheel at the end of one stroke of the handle and moving it entirely out of engagement therewith at the end of its opposite stroke, and means for preventing disengagement of the pawl from the wheel and retrograde movement of the operating handle during the registering stroke of the latter, substantially as described.

8. The combination, with a register wheel and an actuating pawl therefor, of a horizontally movable operating handle for moving the pawl, and a vertically movable arm carried by the handle for controlling the engagement of the pawl with the wheel, substantially as described.

9. The combination, with a register wheel and an actuating pawl therefor, of an operating handle having a horizontal actuating movement for the pawl and also a vertical movement, and an arm carried by said handle and controlling the engagement of the pawl with the wheel upon the vertical movements of the handle, substantially as described.

10. The combination, with a register wheel and a reciprocating pawl-carrier carrying a pawl for actuating said wheel, of an operating handle having a horizontal actuating movement for the pawl and carrying a vertically movable arm for coupling the handle and pawl-carrier together and for controlling the engagement of the pawl with the wheel, substantially as described.

11. The combination, with a register wheel and an actuating pawl therefor movable into and out of engagement with the wheel, of a horizontally movable operating handle carrying an arm for controlling the engagement of the pawl with the wheel, and a lock co-operating with the arm to hold the pawl in engagement with the wheel during the movement of the handle in one direction, substantially as described.

12. The combination, with a register wheel and an actuating pawl therefor movable into and out of engagement with the wheel, of a horizontally movable operating handle carrying an arm for controlling the engagement of the pawl with the wheel, a lock co-operating with the arm to hold the pawl in engagement with the wheel during the registering stroke of the handle, and means for releasing the arm from the lock at the end of such stroke, substantially as described.

13. The combination of an operating handle, a plurality of indicators representing different amounts and normally resting in non-indicating position, and a movable arm and connections between the same and operating handle for moving the indicators to indicating position and maintaining them in such position after the handle has been returned to normal position, substantially as described.

14. The combination of an operating handle, a plurality of indicators representing different amounts and normally resting in non-indicating position, an arm movable with the operating handle in one direction and independently of it in the other, and connections between the handle and arm for causing the latter to move the proper indicator into indicating position at a given operation of the handle, substantially as described.

15. The combination of an operating handle, a plurality of indicators representing different amounts and normally resting in non-indicating position, an arm movable with the handle in one direction and independently of it in the other, means for detaining said arm opposite the proper indicator during the return of the handle to initial position, and connections between the handle and arm for causing the latter to move the indicator to indicating position at the end of the movement of the handle, substantially as described.

16. The combination of a plurality of indicators representing different amounts and normally resting in non-indicating position, a single operating handle common to all of the indicators an arm movable with the handle in one direction and independently of it in the other, a notched plate co-operating with the arm to detain it in position opposite the indicator to be exposed, and connections between said plate and the operating lever for causing the latter to move the arm to throw the indicator into indicating position, substantially as described.

17. The combination, with a plurality of indicators, a searcher-arm therefor and a vibrating carrier for said arm, and a single operating handle for moving the arm into contact with different indicators to move the latter to its exposed position, substantially as described.

18. The combination, with a plurality of indicators, of a vibrating carrier, a searcher-arm carried thereby, a single operating handle common to the indicators for moving the carrier and its arm into position to move a given indicator, and an actuating plate and connections with the operating handle for causing the searcher-arm to move the indicator to its exposed position, substantially as described.

19. The combination, with a plurality of indicators pivotally mounted upon a horizontal support, of a horizontally movable searcher-arm common to said indicators, and a movable plate co-operating with such arm to move a given indicator to its exposed position, substantially as described.

20. The combination, with a plurality of indicators pivotally mounted upon a horizontal support and adapted to be positively rocked in one direction and return to their normal positions by gravity, of a searcher-arm movable lengthwise of the row of indicators and adjacent thereto, a vibrating carrier for said arm, an operating handle for moving the carrier and arm, and an actuating plate and connections with the handle for causing the searcher-arm to move the indicator into exposed position, substantially as described.

21. The combination, with a plurality of indicators, of a carrier, a searcher-arm pivotally mounted in said carrier, an operating handle for moving the carrier and determining the position of the searcher-arm with respect to the indicators, and an actuating bar for rocking the searcher-arm to cause it to move the indicator into exposed position, substantially as described.

22. The combination, with a plurality of indicators, a horizontally vibrating carrier having a spring tending to move it in one direction, a searcher-arm pivotally mounted on said carrier, an operating handle for moving the carrier and determining the position of the searcher-arm with respect to the indicators, and an actuating plate and connections with the handle for rocking the searcher-arm to move the indicator into exposed position, substantially as described.

23. The combination, with a plurality of indicators, of a searcher-arm movable adjacent thereto, a horizontally and vertically movable operating handle for moving the searcher-arm into different positions, an actuating plate for moving the searcher-arm, and connections between the operating handle and said plate whereby upon the vertical movement of the handle the searcher-arm is engaged with a given indicator and upon the return of the handle to initial position the indicator is moved into exposed position, substantially as described.

24. The combination, with a plurality of indicators and a searcher-arm movable adjacent thereto, of an operating handle and connections for controlling the position of the searcher-arm, an actuating plate, and connections with the handle for moving the searcher-arm to throw an indicator into exposed position, and means for compelling a complete movement of the searcher-arm and operating handle to move the indicator to its exposed position, substantially as described.

25. The combination, with a plurality of indicators and a searcher-arm movable adjacent thereto, of an operating handle and connections with the searcher-arm for moving the latter, a latch for holding the actuating arm at the end of its movement in one direction, and means for releasing the latch, substantially as described.

LEO EHRLICH.

Witnesses:
W. PALMER CLARKSON,
H. D. HEUER.